Patented July 7, 1953

2,644,801

UNITED STATES PATENT OFFICE 2,644,801

SULFONATED ARYL ACETYLENE RESINS

Gaetano F. D'Alelio, Pittsburgh, Pa., assignor to Koppers Company, Inc., a corporation of Delaware No Drawing. Application September 24, 1949, Serial No. 117,727

26 Claims. (Cl. 260—2.2)

This invention relates to new ion-exchange resins. More particularly, it relates to the preparation of ion-exchange resins from aryl acetylene compounds.

Ion-exchange resins have been found desirable for a wide variety of commercial uses. For example, such resins are being used in the purification, deionization, or softening of water, the recovery of magnesium from sea water and brine, the recovery of copper and ammonia from waste cuprammonium solutions in rayon plants, the recovery of amino acids from protein hydrolyzates, recovery of certain vitamins from solutions, the separation of fission products obtained from uranium and plutonium, the separation of rare earths, the removal of sodium and copper from oils, the removal of iron and copper from acid liquors, various applications in analytical determinations and in catalyzing esterification, ester hydrolysis, sucrose inversion, etc., and even for the treatment of peptic ulcers.

One of the best types of ion-exchange resins for many of these purposes is disclosed in applicant's U. S. Patent 2,366,007, assigned to General Electric Company. Cation-exchange resins of this type comprise sulfonated copolymers of mono-vinyl-aromatic compounds and divinyl-aromatic compounds, such as prepared by the sulfonation of an insoluble, infusible styrene-divinyl benzene copolymer. One commercial form of this type of cation-exchange resin is known as Dowex 50.

Divinyl benzene monomer, however, is not commercially available in highly concentrated form since purification methods do not permit concentrations higher than approximately 50 percent by weight of divinyl benzene. Such divinyl benzene mixtures as are available contain ethyl styrene, diethyl benzene, the various divinyl benzene isomers, etc. in varying proportions. The same condition is also generally true of other divinyl aryl compounds since the commonly used dehydrogenation method of preparing these divinyl aryl compounds from the corresponding dialkyl aryl compounds results in complex mixtures of the divinyl aryl compounds, the starting dialkyl aryl compounds and the intermediate mono-vinyl aryl compounds, as well as isomers and by-products of the divinyl aryl compound. In any of these complex mixtures, most of the constituents have boiling points which are within a small temperature range, and separation of the monomers by distillation requires careful fractionation. Since the unsaturated compounds, especially the divinyl aryl compounds, have a great tendency to polymerize, the mixtures cannot be subjected to a careful or prolonged distillation without considerable loss of monomer through polymerization. Therefore, the use of these divinyl aryl compounds is generally limited to mixtures having concentrations of no more than about 50 percent divinyl aryl compound.

The fact that these divinyl aryl compounds are commercially available only in such complex mixtures in which the proportions of the various components are unpredictable and difficult to control makes it difficult to control exactly the nature of the copolymers resulting from polymerization with styrene, etc. Moreover, the presence of compounds such as diethyl benzene in the polymerization mixture retards the formation of high molecular weight polymers, and variations in the available amount of divinyl aryl compounds in these mixtures cause variations in the amount of cross-linking accomplished in the resulting copolymers.

Ion-exchange resins of great utility have now been found which comprise the water-insoluble, sulfonated polymers of aryl acetylenes. These ion-exchange resins can be prepared by the sulfonation of cross-linked aryl acetylene polymers and are especially efficient in the adsorption of cations from liquid media.

Any polymerizable aryl acetylene, which advantageously has at least one nuclear position available for substitution by a sulfonic acid group, can be used for preparing the ion-exchange resins disclosed herein, for example, phenyl acetylene, tolyl acetylene, xylyl acetylene, naphthyl acetylene, para-phenyl-phenyl acetylene, etc., and various derivatives thereof, such as the chloro, alkyl, alkenyl, etc. The resin products comprise homopolymers of aryl acetylenes, copolymers of any number of aryl acetylenes or copolymers of one or more aryl acetylenes with any number of other copolymerizable ethylenic monomers.

The aryl acetylene polymers suitable for the practice of this invention are cross-linked polymers, an aryl acetylene itself acting as cross-linking agent either in a homopolymer or in a copolymer with other aryl acetylenes or in a copolymer with other copolymerizable monomers. When the copolymerizable monomers contain aromatic nuclei having positions available for substitution, the attachment of sulfonic acid groups may be made on the aromatic nuclei of both the aryl acetylene and the copolymerizing monomer. Copolymerizable monomers which have aromatic nuclei available for substitution include vinyl aryls, such as styrene, vinyl naphthalene, vinyl diphenyl, vinyl fluorene, etc., and their nuclear-substituted derivatives such as alkyl, aryl, alkaryl, aralkyl, cycloalkyl, alkoxy, aryloxy, chloro, fluoro, chloromethyl, fluoromethyl, and trifluoromethyl nuclear derivatives, for example methyl-styrenes, e. g., o, m and p-methyl-styrenes, dimethyl-styrenes, o, m and p-ethyl-styrenes, isopropyl-styrenes, tolyl-styrenes, benzyl-styrenes, cyclohexyl-styrenes, methoxy-styrenes, phenoxy-styrenes, o, m, and p-chlorostyrenes, o, m and p-fluoro-styrenes, chloromethyl-styrenes, fluoromethyl-styrenes, trifluoromethyl-styrenes, vinyl-methyl-naphthalenes, vinyl-ethyl-naphthalenes, vinyl-chloro-naphthalenes, vinyl-methyl-chloro-naphthalenes, etc. Other aromatic monomers which can also be used include aromatic compounds having a vinyl group containing an alkyl group in its alpha position, e. g., isopropenyl or alpha-methyl-vinyl, alpha-ethyl-vinyl, etc. Such alpha-alkyl-vinyl groups may be substituted on benzene, naphthalene, diphenyl, fluorene nuclei, etc., and may have other substituents on the aromatic nuclei as illustrated above for the vinyl aryl compounds. For ease of polymerization, the alpha-alkyl group is advantageously methyl or ethyl. When the alpha-alkyl-vinyl type of aromatic monomer is used as a copolymerizing monomer, ionic-type polymerization catalysts may be used advantageously.

An especially advantageous mixture to use in the practice of this invention is a mixture of styrene and phenyl acetylene which is recovered in the purification of styrene obtained by the pyrolytic dehydrogenation of ethyl benzene or from light oils obtained from by-product coal tar and from coal gas production. For most purposes the presence of phenyl acetylene in styrene is undesirable since subsequent polymerization produces a cross-linked styrene polymer or other types of polymers having properties generally undesirable for molding purposes. However, the cross-linked polymer product of such a mixture is suitable for sulfonation to produce ion-exchange resins in accordance with the practice of this invention.

Certain other monomers, such as isobutylene, isoamylene, etc. may be used in place of or in addition to the above-mentioned aromatic compounds. However, these other monomers should not have functional groups which will interfere with the sulfonation treatment or ion-exchange activities of the products, or which may be ruptured to give substantial decrease in length of polymer chains or in cross-linking. Some copolymers prepared by the copolymerization of phenyl acetylene with copolymerizable compounds, such as styrene and isobutylene, are not new and have been disclosed previously. However, the insoluble, infusible copolymers of these monomers are new as are their sulfonated derivatives claimed herein which are suitable for use as ion-exchange resins. It is also possible to make these resins from polymerizable monomers which have sulfonic acid groups attached to aromatic nuclei and thereby avoid the requirement for subsequent sulfonation.

The invention may be best described by the following examples. These examples serve to illustrate various methods of practicing the invention and are not intended as limitations to the scope of the invention. In these examples and throughout the specification "parts" and "percent" are given in parts and percent by weight.

*Example I*

Cross-linked copolymers in bead form are made by suspension polymerization in a pressure-tight autoclave by the following procedure. To the autoclave are added:

0.18 part benzoyl peroxide—dissolved in the styrene
0.05 part t-butyl perbenzoate—dissolved in the styrene
95 parts styrene
5 parts phenyl acetylene
200 parts distilled water
3 parts hydroxy apatite (submicronic particle size)
0.03 part sodium oleate The autoclave is then closed and agitated by a rocking mechanism while the autoclave is immersed in a controlled-temperature bath at 90° C. for 10 hours and then at 113–115° C. for 5 hours. In each case, the resultant copolymer beads are washed with dilute HCl, then with water, and subsequently dried at 70° C. for about two hours.

Fifty parts of these copolymer beads are sulfonated by reacting with about 290 parts chlorosulfonic acid until hydrogen chloride is no longer liberated. The beads are removed from unreacted chlorosulfonic acid and by-products by filtration or decantation, and the sulfonated beads are then treated with a large volume of water to destroy any residual chlorosulfonic acid and any acid chloride that might have formed. After filtering, washing and drying, a good yield of sufonated copolymer is obtianed. From the weight of the yield as compared to the original weight of copolymer, it is possible to calculate approximately the average number of sulfonic acid groups which have been substituted onto each aryl nucleus. By the preceding technique it is generally possible to attach an average of 1.5 or more sulfonic acid groups to each aryl nucleus. For many applications as little as an average of 0.1 sulfonic group per aryl nucleus may be introduced.

In the preceding example the phenyl acetylene may be replaced by tolyl acetylene, xylyl acetylene, naphthyl acetylene, etc., and the styrene may be replaced by one or more of the vinyl aryl compounds previously mentioned. The sulfonation may be accomplished also by using sulfuric acid, fuming sulfuric acid, sulfur trioxide alone or in the presence of liquid $SO_2$ or another non-reactive diluent, etc. The following examples illustrate how the sulfonated copolymers of this invention can be used for adsorbing cations from liquid medium.

*Example II*

Ten parts of the water-insoluble sulfonated copolymer of Example I are wet with 100 parts of distilled water, and 200 parts of standardized sodium hydroxide solution are added with shaking. After standing 15 minutes the solution is filtered and the sodium hydroxide remaining in solution is determined by titrating the filtrate with standardized hydrochloric acid. The efficiency of the resin is determined by calculating the ratio of sodium ions actually removed from the solution to the sodium ions theoretically removable. A very good ion-exchange efficiency is shown by calculations which indicate that approximately each of the calculated sulfonic acid groups in the copolymer removes a sodium ion from the solution. The sulfonated resin can also be converted to the sodium salt by treatment with a dilute or concentrated sodium chloride solution.

Example III

Ten parts of the water-insoluble sulfonated copolymer of Example I are wet with 100 parts of distilled water, and then 200 parts of a standardized calcium chloride solution are added with shaking. After standing 15 minutes, the solution is filtered and the amount of hydrochloric acid generated by the adsorption of the calcium ion from the solution is determined by titration with standardized sodium hydroxide solution. A good ion-exchange efficiency of the resin is indicated by calculations made according to the method described in Example II.

Example IV

The exhausted resin from Example II is regenerated by treating it with approximately ⅓ N hydrochloric acid. After filtering off the acid and washing well with distilled water, the sulfonated copolymer is retested for its ability to adsorb cations according to the method described in Example II. The efficiency after regeneration approximates the original capacity of the resin.

Example V

Fifty parts of a finely divided, insoluble, infusible copolymer prepared by polymerizing a mixture of 75 parts phenyl acetylene and 25 parts isobutylene at approximately —80° C. under the catalytic influence of an ethyl chloride solution of aluminum chloride is treated with about 290 parts of chlorosulfonic acid according to the procedure of Example I. The sulfonated copolymer shows good cation-exchange activity when tested by the procedures of Examples II–IV.

Although the above examples show the use of phenyl acetylene with styrene and isobutylene, it will be understood that other aryl acetylenes, as mentioned above, and other copolymerizable ethylenic compounds as previously mentioned may be used in various proportions for preparing the water-insoluble sulfonated polymers. Since the sulfonic acid groups are the active ion-removing groups in these products and since these groups are introduced most easily into an aryl nucleus, it is advantageous that the major portion of the polymerization mixture be of polymerizable monomers containing an aryl nucleus, and it is necessary that there are positions available on the aryl nucleus for attaching sulfonic acid groups. For this latter reason it is advantageous that the aryl nucleus has few, if any, constituents thereon.

Cross-linked polymers of aryl acetylenes suitable for the practice of this invention can be prepared by any suitable method which will give infusible, insoluble resins, for example, by mass, solution, emulsion or suspension polymerization. The polymerizations may be advantageously catalyzed by various types of catalysts, such as peroxides, e. g., benzoyl, hydrogen, acetyl, acetylbenzoyl, phthalyl, lauroyl peroxides, t-butyl-hydroperoxide, etc.; other per-compounds, e. g., ammonium persulfate, sodium persulfate, sodium perchlorate, etc.; Friedel-Crafts type catalysts, advantageously at low temperatures, e. g., $AlCl_3$, $SnCl_4$, $BF_3$, etc. and $H_2SO_4$, $H_3PO_4$, etc.

As previously mentioned, in addition to chlorosulfonic acid other sulfonating agents can be used, e. g., concentrated sulfuric acid, fuming sulfuric acid, sulfur trioxide, etc. In the use of sulfonating agents such as sulfuric acid it is possible that cross-linking may be effected under the catalytic effect of the sulfuric acid either by polymerization or alkylation of the aromatic rings by the olefinic unsaturation in the polymer chain.

Cations which may be removed from various solutions by the sulfonated, insoluble polymers of this invention include, in addition to the cations indicated in the examples, lead ions, magnesium ions, iron ions, silver ions, etc. In fact any cations which react with the sulfonic acid groups of the resin to form salts will be effectively removed from the solution. After the sulfonated resin has adsorbed the cations, it can readily be regenerated by washing with dilute acid, preferably a mineral acid which forms soluble salts with the adsorbed cations.

An inert material such as diatomaceous earth, Alundun, coke, silica, cinders, porous glass, etc., may be used as a carrier for the resin in order to increase the effective surface of the resin for ion-exchange. These carriers may be introduced by adding them any time prior to complete polymerization of the monomers to an infusible, insoluble state. An emulsion or dispersion type of polymerization is advantageous for the coating of such carrier materials with the resin.

The sulfonation may be effected on various forms of the cross-linked polymers, e. g., powder, bead, pellet, coating, etc. However, since the ion-exchange utility of the product is related to effective surface, it is often advantageous to have the polymer shaped in the particular physical form in which it will ultimately be used so that the greatest concentration of sulfonic acid groups will be on easily accessible surfaces.

While there are above disclosed but a limited number of embodiments of the invention, it is possible to produce still other embodiments without departing from the inventive concept herein disclosed; and it is, therefore, desired that only such limitations be imposed upon the appended claims as are stated therein or required by the prior art.

The invention claimed is:

1. A water-insoluble resin containing a plurality of sulfonic acid groups, said groups being attached to an insoluble, infusible resin prepared by the polymerization of a polymerizable mass comprising a polymerizable aryl acetylene hydrocarbon compound.

2. An insoluble, infusible, sulfonated resin comprising a sulfonated polymerization product of a polymerizable mass comprising a polymerizable aryl acetylene hydrocarbon compound.

3. A water-insoluble resin of claim 1, in which the polymerizable aryl acetylene compound is phenyl acetylene.

4. A water-insoluble resin of claim 1, in which the polymerizable aryl acetylene compound is naphthyl acetylene.

5. A water-insoluble resin of claim 1, in which the polymerizable mass contains a copolymerizable aromatic compound selected from the class consisting of copolymerizable mono-vinyl-aromatic and mono-(alpha-alkyl-vinyl)-aromatic hydrocarbon compounds, said alpha-alkyl groups having less than 3 carbon atoms.

6. A water-insoluble resin of claim 5, in which the polymerizable aryl acetylene hydrocarbon compound is phenyl acetylene and the copolymerizable aromatic compound is styrene.

7. A water-insoluble resin of claim 5, in which the polymerizable aryl acetylene hydrocarbon compound is naphthyl acetylene and the copolymerizable aromatic compound is vinyl naphthalene.

8. An insoluble, infusible, sulfonated polymeric aryl acetylene hydrocarbon compound.

9. An insoluble, infusible, sulfonated polymeric phenyl acetylene.

10. An insoluble, infusible, sulfonated polymeric phenyl acetylene containing in the polymer molecule at least one copolymerizable aromatic compound of the class consisting of mono-vinyl-aromatic and mono-(alpha-alkyl-vinyl)-aromatic compounds, said alpha-alkyl groups having less than 3 carbon atoms.

11. An insoluble, infusible, sulfonated polymeric phenyl acetylene of claim 10, in which the copolymerizable aromatic compound is styrene.

12. An insoluble, infusible resin of claim 2, in which the resin is in bead form.

13. An insoluble, infusible resin of claim 2, in which the polymerizable aryl acetylene compound is phenyl acetylene and the resin is in bead form.

14. An insoluble, infusible resin of claim 2, in which the polymerizable aryl acetylene is naphthyl acetylene and the resin is in bead form.

15. An insoluble, infusible resin of claim 2, in which the polymerizable aryl acetylene is phenyl acetylene, the polymerizable mixture also contains styrene and the resin is in bead form.

16. An inert carrier coated with an insoluble, infusible resin of claim 1.

17. In a process for the preparation of a water-insoluble, ion-exchange resin, the step of sulfonating an insoluble, infusible polymeric aryl acetylene hydrocarbon compound.

18. The process step of claim 17, in which the polymeric aryl acetylene hydrocarbon compound contains in the polymer molecules a copolymerizable aromatic compound of the class consisting of copolymerizable mono-vinyl-aromatic and mono - (alpha - alkyl - vinyl) - aromatic hydrocarbon compound, said alpha-alkyl groups having less than 3 carbon atoms.

19. The process step of claim 17, in which the polymerizable aryl acetylene compound is phenyl acetylene.

20. The process step of claim 17, in which the polymerizable mass also contains styrene.

21. The method of treating liquid media to remove cations therefrom which comprises contacting said media with an insoluble, infusible, sulfonated resin and separating said resin from the liquid media, said resin comprising the sulfonated polymerization product of a polymerizable mass comprising a polymerizable aryl acetylene hydrocarbon compound.

22. The method of claim 21, in which the polymerizable aryl acetylene compound is phenyl acetylene.

23. The method of claim 21, in which the polymerizable aryl acetylene compound is naphthyl acetylene.

24. The method of claim 21, in which the polymerizable aryl acetylene compound is phenyl acetylene and the polymerizable mass also contains styrene.

25. The method of claim 21, in which the polymerizable aryl acetylene compound is naphthyl acetylene and the polymerizable mass also contains vinyl naphthalene.

26. In a process for the preparation of an insoluble, infusible, ion-exchange resin, the step of sulfonating an insoluble, infusible polymeric aryl acetylene hydrocarbon compound which contains in the polymer molecules a copolymerizable aromatic compound of the class consisting of copolymerizable mono-vinyl-aromatic and mono-(alpha-alkyl-vinyl)-aromatic hydrocarbon compound, said alpha-alkyl groups having less than three carbon atoms.

GAETANO F. D'ALELIO.

References Cited in the file of this patent

UNITED STATES PATENTS

| Number | Name | Date |
|---|---|---|
| 2,255,396 | Sparks | Sept. 9, 1941 |
| 2,290,547 | Dreisbach | July 21, 1942 |
| 2,366,007 | D'Alelio | Dec. 26, 1944 |
| 2,466,675 | Bauman | Apr. 12, 1949 |
| 2,518,420 | Evers | Aug. 18, 1950 |

FOREIGN PATENTS

| Number | Country | Date |
|---|---|---|
| 840,756 | France | Jan. 23, 1939 |